Nov. 5, 1957        C. B. OSBORN III        2,812,210
HIGH LIFT, SIDE DELIVERY, DUMP TRAILER
Filed May 6, 1955        2 Sheets-Sheet 1
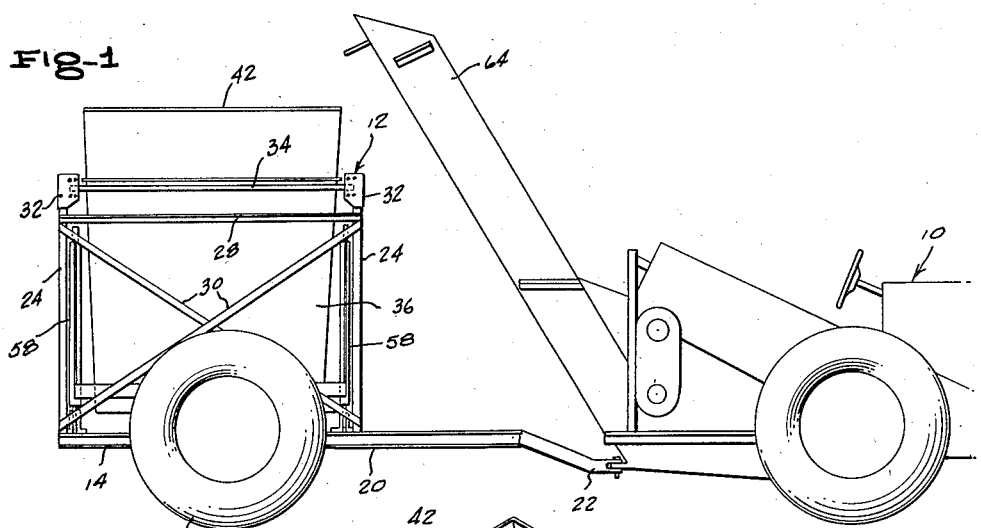
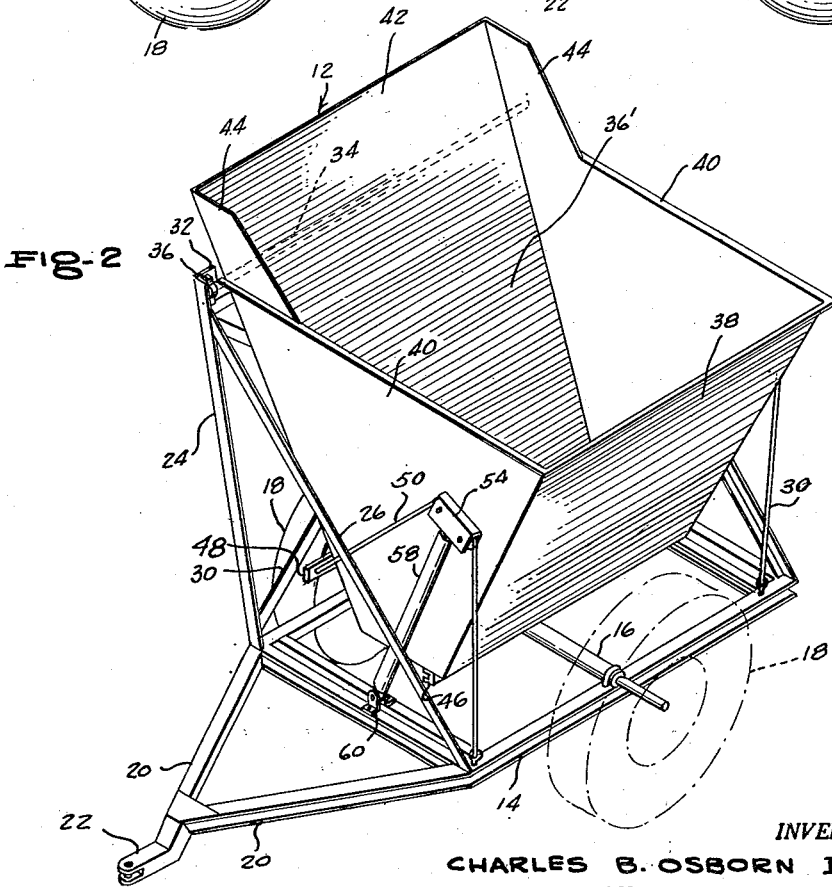
INVENTOR.
CHARLES B. OSBORN III
BY
McMorrow, Berman + Davidson
ATTORNEYS

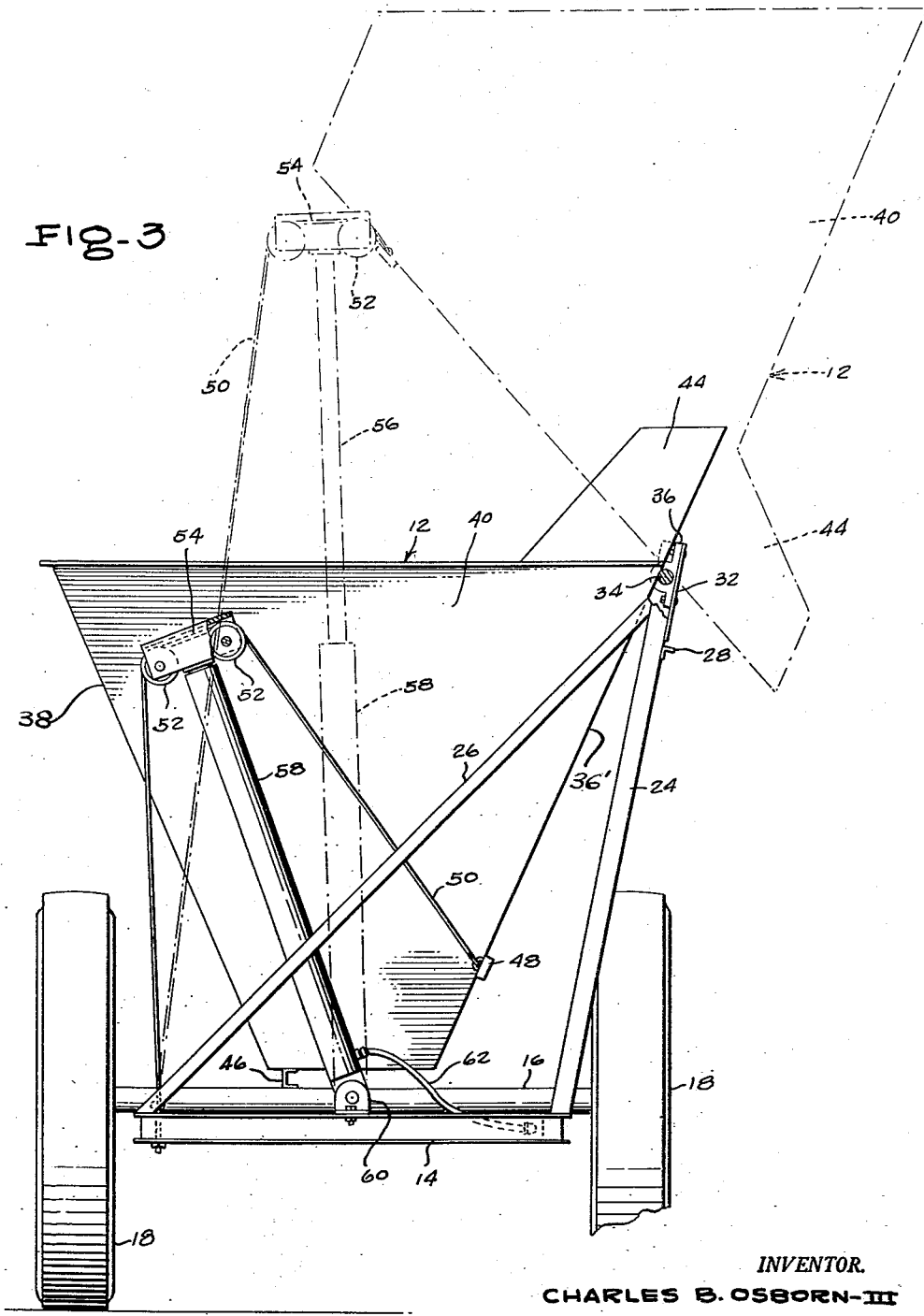

United States Patent Office 2,812,210
Patented Nov. 5, 1957

2,812,210
HIGH LIFT, SIDE DELIVERY, DUMP TRAILER

Charles B. Osborn III, Aberdeen, Md.

Application May 6, 1955, Serial No. 506,480

2 Claims. (Cl. 298—18)

This invention relates to a single axle trailer having a hydraulically actuated dump body or hopper, so constructed as to raise a heavy load and discharge it, side delivery, into a truck or wagon.

The dump trailer constituting the present invention is particularly adapted for use in conjunction with field corn pickers, sweet corn harvesters, combines, and the like, and in fact with any other agricultural harvesting machine in a situation in which it is necessary to accumulate and transfer to some other transporting vehicle the harvested product.

Heretofore, the transfer of a harvested product, for example sweet corn, from the harvesting machine to a transporting vehicle such as a truck, has involved certain inefficiencies, resulting in loss of time, damage to the harvester or truck, and the requirement for skillful maneuvering on the part of both the truck operator and harvesting machine operator.

Considering, for example, the harvesting of sweet corn, the harvesting machine is equipped with a rear or side elevator or both, the purpose being to load the harvested corn into a conveyance such as a truck. In some instances, it has been the practice for the harvester to draw a plurality of small wagons behind it, which, when loaded, must be unhitched after which an empty wagon is hitched to the machine in its place. More equipment is then required to transfer the harvested product from the wagon to a motor truck.

In another method followed, it has been the practice to accompany the harvesting machine with a motor truck, with the corn being loaded into the truck as the harvesting machine and truck progress through the field. This has disadvantages in that the method requires a truck with each harvesting machine constantly, thus necessitating that extra trucks stand by at all times, with an attended severe expense if top production is to be maintained unchecked. Further, when all trucks are loaded and dispatched from the field production must be stopped completely until a truck returns, and thus, it follows that each truck permits only one harvester to be in production, with no harvester producing unless a truck, ready to take a load, is at its side. Still further, the operation of the truck throughout the field slows ground speed, and results in severe maintenance problems causing high operating costs such as overheating, high fuel consumption, excessive wear, and breakage and damage to the harvester and the truck when collisions occur due to lack of skill on the part of drivers or unavoidable factors. Further, harvester products are wasted by droppage onto the ground, when the truck is not properly placed relative to the harvesting machine elevator due to poor coordination between the operators. Still further, in muddy fields, trucks may not be able to make their way resulting in an impractical operational situation.

According to the present invention, a high lift side delivery dump trailer, drawn by the harvesting machine to receive the harvested products as the machine progresses through the field, is adapted to accumulate a three ton load, thus permitting the harvesting machine to continue operations unchecked even when the intervals at which a truck arrives to receive a load are highly infrequent. Further, the dump trailer formed according to the present invention is so designed as to be hydraulically swung to a load-discharging position, over a truck, without requirement of special skill or coordination on the part of the harvesting machine or truck operator, and when in said position, is so disposed as to insure the dumping of the complete load into the truck without danger of spillage onto the ground.

Among important objects of the invention are to provide a dump body as described which will be particularly designed to permit accumulation of a substantial load therein, will have a high lift when swung to a load discharging position, so as to permit the discharge of the load into trucks of heights up to one hundred inches, will discharge its load into the truck without requirement of movement of the truck over unharvested portions of the field, will be actuable to a load-discharging position by hydraulic means connectable with ease and facility to the conventional hydraulic system of the harvesting machine, and will be without interference to the harvesting operation, and with a minimum amount of equipment and manpower, and hence, at minimum expense.

Other objects will appear from the following description, the claims appended thereto, and from the annexed drawings in which like reference characters designate like parts throughout the several views and wherein:

Figure 1 is a side elevational view of the dump trailer formed according to the present invention, a harvesting machine to which the same is attached being illustrated fragmentarily in side elevation;

Figure 2 is a perspective view, on an enlarged scale, of the trailer body per se; and Figure 3 is a rear end elevational view of the trailer body, the scale being still further enlarged, the dotted lines showing the hopper in its load-discharging position.

Designated generally at 10 is a conventional harvesting machine, such as a sweet corn harvester, and at 12 there has been similarly designated the high lift dump trailer formed according to the present invention.

The trailer includes a support frame 14 formed as a rectangular, open framework, and mounted upon said framework intermediate opposite ends thereof, and extending transversely of the framework, is a single axle 16 carrying ground wheels 18.

The support frame includes, at its front end, forwardly converging frame members 20, fixedly secured at their convergent, front ends to a downwardly offset tongue 22 connectable to the draw bar of the harvesting machine.

Welded or otherwise fixedly secured at their lower ends to the rectangular framework, at one side of the framework, are elongated, upwardly extending standards 24 forming part of a side frame which, as shown in Figure 3, is inclined slightly from the vertical, that is, it is at a slight obtuse angle to the plane of the support frame 14. The standards 24 are braced by inclined brace members 26 secured fixedly at their upper ends to the upper ends of the members 24, and at their lower ends to the other side of the support frame. Crossing brace elements 30 are fixedly secured to the standards 24 as shown in Figure 1, and further bracing the standards and completing the formation of the side frame is an upper, horizontally disposed brace member 28.

Mounted upon the upper ends of the post 24 are bearing plates 32, and extending between said bearing plates is a horizontally disposed pivot bar 34 journaled at its ends in bearings 36 carried by the plates 32. The bar 34 is part of the swingable dump body, the dump body including a hopper having a side wall 36' to which the bar 34 is welded, with the ends of the bar 34 projecting beyond the ends of the hopper. At the other side of the hopper, there is provided a side wall 38, and integrally or otherwise fixedly connected between the side walls 36', 38 are end walls 40. The side walls diverge in an upward direction, while the end walls are disposed in vertical planes, thus providing an upwardly flaring hopper adapted to permit the accumulation of a substantial load therein. In an actual, operational embodiment of the invention, a hopper so formed is adapted to hold a three ton load of sweet corn or similar products, and to discharge it, side delivery, into a truck or wagon disposed alongside the same.

The side wall 36', as shown in Figure 2, is of greater height than the side wall 38, thus defining at its upper end a lip 42, the end walls 40 having upwardly projecting extensions 44 integral with the lip, thus providing a discharge chute extension upon the pivot-bar-supporting side of the hopper, that will insure against spillage of the harvested product when the hopper is swung about the axis of bar 34 to the dotted line position of the hopper shown in Figure 3.

Welded to the floor of the hopper is a channel member 46 extending longitudinally of the hopper adjacent the side wall 38 thereof. When the hopper is swung to its lowered position, member 46 engages against the housing of the axle, said axle housing providing a stop for the hopper. Further, the channel member reinforces the hopper at its lower end.

Horizontally disposed upon and spot welded or otherwise fixedly secured to the side wall 36' is a cable attaching bar 48, the ends of which project beyond the end walls 40 and are connected to lifting cables 50. Cables 50, as shown in Figure 3, are turned about rollers 52 journaled upon a roller support bracket 54 of inverted U-shape in cross section, mounted upon a ram or piston rod 56 of a hydraulic cylinder 58 pivotally connected at 60 to the adjacent frame end. The cylinders 58 are disposed in closely spaced relation to the end walls 40, and the cables 50 are connected at their other ends to that side of the support frame on which the side frame is mounted.

A line 62 for supplying fluid under pressure to the cylinder 58 extends from the cylinder, and is connectable to the hydraulic system of the harvesting machine.

In use of the structure, the dump trailer is drawn behind the harvesting machine, and is positioned to receive the harvested product from the conveyer 64. Subsequently, when the dump trailer is filled, and a truck is alongside the same ready to receive a load, fluid under pressure is supplied to the cylinders 58, elevating the rams, so as to exert upward pull, through the medium of cable 50, upon the cable attaching bar 48. As a result, as the ram moves upwardly, the hopper will swing about the axis of bar 34 (see Figure 3) in a clockwise direction in Figure 3, to the dotted line position shown in this figure of the drawings. When the ram is extended to its maximum amount, the hopper will have swung to a load-discharging position over the side of the accompanying truck, with the lip extending over the adjacent side wall of the truck body to insure against spillage.

The operation, in this connection, is carried out with minimum interference to the harvesting operation, since there is no requirement for skillful maneuvering or coordination between the operators of the harvesting machine and truck. As a result, the harvesting machine operator may devote his entire attention to the operation of his machine, thus permitting the crop to be gathered at peak efficiency, and all of the harvesting crop is deposited in the trailer with no attention from the driver of the machine, to eliminate waste. Further, the harvesting machine may be operated with the truck away from the field, and still further, the truck may be stationed at the end of the field in an idle position while the harvesting machine is in operation and is loading the trailer, to save wear on the truck and to permit harvesting operations to be carried on without loss of efficiency under muddy conditions.

Still another important characteristic of the invention resides in the fact that when new fields are being opened up, that is, harvesting operations are begun on said fields, the trailer travels directly behind the harvesting machine, so that no unharvested crop is crushed and destroyed.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A high lift, side delivery dump trailer comprising a support frame extending within a substantially horizontal plane and adapted at one end for connection to a traction vehicle; an axle extending transversely of the support frame intermediate the opposite ends thereof; ground wheels carried by the axle at opposite sides of the support frame; a side frame projecting upwardly from one side of the support frame; a hopper overlying the support frame; said hopper including a pivot bar at one side thereof near the upper end of the hopper, said pivot bar being pivotally supported upon the upper end of the side frame and providing an axis about which the hopper may swing between said position thereof overlying the support frame and a load-discharging position in which the hopper is partially inverted for discharge of a load into an area spaced laterally, outwardly of the side frame; hydraulic cylinders pivotally connected at one end to the opposite ends of the support frame; a piston working in each of said cylinders; a roller means carried by each of the pistons; a cable extending over each of said roller means and having one end connected to the hopper at the adjacent one side thereof and having the other end connected to the adjacent support frame end, whereby to swing the hopper between said positions thereof on extension of the piston, said axle providing a stop for the hopper on swinging of the hopper to its load-accumulating position.

2. A side delivery dump trailer comprising: a frame structure including a wheeled support frame and a side frame rigid with and extending upwardly from the support frame; a hopper open at its top and pivotally connected to the upper end of the side frame for movement about a single axis extending longitudinally of the hopper at one side thereof substantially in the plane of the open top, between a loading position in which the hopper opens upwardly and is supported upon the support frame, and a dumping position angularly spaced about said axis a distance such that the hopper opens laterally for side delivery of the contents thereof; and means on the frame structure for swinging the hopper between said positions, comprising a hydraulic lift mechanism pivoted at one end upon the support frame for swinging movement about an axis paralleling the hopper axis, and including at its other end a ram extensible along a path radiating from the second axis and pulley means carried by the ram, and a cable connected at one end to said side of the hopper at a location intermediate the top and bottom of the hopper, said cable being trained intermediate its ends about the pulley means and being connected at its other end to the support frame.

References Cited in the file of this patent

UNITED STATES PATENTS

| 955,875 | Hunt | Apr. 26, 1910 |
| 1,065,469 | Robben et al. | June 24, 1913 |
| 1,372,912 | Sibrava | Mar. 29, 1921 |
| 2,234,599 | Johnston | Mar. 11, 1941 |
| 2,432,472 | Hastings | Dec. 9, 1947 |
| 2,520,844 | Kunert | Aug. 29, 1950 |
| 2,543,210 | Wagstaff | Feb. 27, 1951 |
| 2,628,729 | Borchers | Feb. 17, 1953 |